(12) United States Patent
Schunder

(10) Patent No.: US 8,731,814 B2
(45) Date of Patent: May 20, 2014

(54) MULTI-MODAL NAVIGATION SYSTEM AND METHOD

(75) Inventor: Mark Schunder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 12/829,819

(22) Filed: Jul. 2, 2010

(65) Prior Publication Data

US 2012/0004841 A1    Jan. 5, 2012

(51) Int. Cl.
*G06G 7/78* (2006.01)
*G01C 21/00* (2006.01)

(52) U.S. Cl.
USPC ................................ 701/201; 701/209; 705/3

(58) Field of Classification Search
USPC .......................................................... 701/201
See application file for complete search history.

(56) References Cited

U.S. PATENT DOCUMENTS

| | | | |
|---|---|---|---|
| 4,937,751 A | 6/1990 | Nimura et al. | |
| 5,177,685 A | 1/1993 | Davis et al. | |
| 5,220,507 A | 6/1993 | Kirson | |
| 5,275,474 A | 1/1994 | Chin et al. | |
| 5,291,412 A | 3/1994 | Tamai et al. | |
| 5,351,779 A | 10/1994 | Yamashita | |
| 5,394,332 A | 2/1995 | Kuwahara et al. | |
| 5,406,491 A | 4/1995 | Lima | |
| 5,406,492 A | 4/1995 | Suzuki | |
| 5,487,002 A | 1/1996 | Diller et al. | |
| 5,578,748 A | 11/1996 | Brehob et al. | |
| 5,742,922 A | 4/1998 | Kim | |
| 5,767,795 A | 6/1998 | Schaphorst | |
| 5,790,973 A | 8/1998 | Blaker et al. | |
| 5,848,364 A | 12/1998 | Ohashi | |
| 5,901,806 A | 5/1999 | Takahashi | |
| 6,005,494 A | 12/1999 | Schramm | |
| 6,028,537 A | 2/2000 | Suman et al. | |
| 6,101,443 A | 8/2000 | Kato et al. | |
| 6,314,369 B1 | 11/2001 | Ito et al. | |
| 6,374,177 B1 | 4/2002 | Lee et al. | |
| 6,424,363 B1 | 7/2002 | Matsuba et al. | |
| 6,424,888 B1 | 7/2002 | Sone et al. | |
| 6,427,115 B1 | 7/2002 | Sekiyama | |
| 6,427,117 B1 * | 7/2002 | Ito et al. | 701/421 |
| 6,462,676 B1 | 10/2002 | Koizumi | |
| 6,484,092 B2 | 11/2002 | Seibel | |

(Continued)

FOREIGN PATENT DOCUMENTS

| | | |
|---|---|---|
| JP | 2005091193 | 4/2005 |
| JP | 20080078696 | 4/2008 |
| JP | 20080162578 | 7/2008 |
| WO | 2008037471 A2 | 4/2008 |

OTHER PUBLICATIONS

Ford Motor Company, "Navigation System: SYNC," Owner's Guide Supplement, SYNC Version 1 (Jul. 2007).

(Continued)

*Primary Examiner* — Hiep V Nguyen
(74) *Attorney, Agent, or Firm* — Brooks Kushman P.C.; Jennifer M. Stec

(57) ABSTRACT

One or more embodiments may include a multi-modal navigation system and method. Route information may be received for generating a navigation route which may comprise multiple modes of transportation to a destination. GPS data may also be received. The navigation route to the destination across the multiple modes of transportation may be determined. The route may be updated as the route is traversed. The navigation route across the multiple modes of transportation may be output based on the GPS data.

17 Claims, 5 Drawing Sheets

(56) References Cited

U.S. PATENT DOCUMENTS

| | | |
|---|---|---|
| 6,484,093 B1 | 11/2002 | Ito et al. |
| 6,487,477 B1 | 11/2002 | Woestman et al. |
| 6,533,367 B1 | 3/2003 | Latarnik et al. |
| 6,574,538 B2 | 6/2003 | Sasaki |
| 6,574,551 B1 | 6/2003 | Maxwell et al. |
| 6,691,025 B2 | 2/2004 | Reimer |
| 6,791,471 B2 | 9/2004 | Wehner et al. |
| 6,829,529 B2 | 12/2004 | Trefzer et al. |
| 6,834,229 B2 | 12/2004 | Rafiah et al. |
| 6,866,349 B2 | 3/2005 | Sauter et al. |
| 6,904,362 B2 | 6/2005 | Nakashima et al. |
| 6,999,779 B1 | 2/2006 | Hashimoto |
| 7,053,866 B1 | 5/2006 | Mimran |
| 7,089,110 B2 | 8/2006 | Pechatnikov et al. |
| 7,113,107 B2 | 9/2006 | Taylor |
| 7,167,799 B1 | 1/2007 | Dolgov et al. |
| 7,243,134 B2 | 7/2007 | Bruner et al. |
| 7,286,931 B2 | 10/2007 | Kawasaki |
| 7,315,259 B2 | 1/2008 | Sacks |
| 7,369,938 B2 | 5/2008 | Scholl |
| 7,421,334 B2 | 9/2008 | Dahlgren et al. |
| 7,486,199 B2 | 2/2009 | Tengler et al. |
| 7,571,042 B2 | 8/2009 | Taylor et al. |
| 7,642,901 B2 | 1/2010 | Kato et al. |
| 7,653,481 B2 | 1/2010 | Tramel |
| 7,726,360 B2 | 6/2010 | Sato et al. |
| 7,804,423 B2 | 9/2010 | Mudalige et al. |
| 7,818,380 B2 | 10/2010 | Tamura et al. |
| 7,822,380 B2 | 10/2010 | Wu |
| 7,822,546 B2 * | 10/2010 | Lee .............. 701/412 |
| 7,826,945 B2 | 11/2010 | Zhang et al. |
| 7,920,969 B2 | 4/2011 | Mudalige et al. |
| 8,145,376 B2 | 3/2012 | Sherony |
| 8,290,704 B2 | 10/2012 | Bai |
| 2001/0001847 A1 | 5/2001 | Hessing |
| 2002/0087262 A1 | 7/2002 | Bullock et al. |
| 2002/0152018 A1 * | 10/2002 | Duckeck .............. 701/201 |
| 2003/0040866 A1 | 2/2003 | Kawakami |
| 2003/0040868 A1 | 2/2003 | Fish et al. |
| 2003/0158652 A1 | 8/2003 | Friedrichs et al. |
| 2004/0021583 A1 | 2/2004 | Lau et al. |
| 2004/0117108 A1 | 6/2004 | Nemeth |
| 2005/0085956 A1 | 4/2005 | Losey |
| 2005/0144573 A1 | 6/2005 | Moody et al. |
| 2005/0159881 A1 | 7/2005 | Furukawa |
| 2006/0025923 A1 | 2/2006 | Dotan et al. |
| 2006/0026335 A1 | 2/2006 | Hodgson et al. |
| 2006/0089788 A1 | 4/2006 | Laverty |
| 2006/0168627 A1 | 7/2006 | Zeinstra et al. |
| 2006/0172745 A1 | 8/2006 | Knowles |
| 2006/0184314 A1 * | 8/2006 | Couckuyt et al. ............. 701/202 |
| 2006/0190164 A1 | 8/2006 | Glaza |
| 2006/0241857 A1 | 10/2006 | Onishi et al. |
| 2006/0282214 A1 | 12/2006 | Wolterman |
| 2007/0038362 A1 | 2/2007 | Gueziec |
| 2007/0050248 A1 | 3/2007 | Huang et al. |
| 2007/0093955 A1 | 4/2007 | Hughes |
| 2007/0104224 A1 | 5/2007 | Conner et al. |
| 2007/0143482 A1 | 6/2007 | Zancho |
| 2007/0143798 A1 | 6/2007 | Jira et al. |
| 2007/0198172 A1 | 8/2007 | Sumizawa et al. |
| 2007/0203643 A1 | 8/2007 | Ramaswamy et al. |
| 2007/0203646 A1 | 8/2007 | Diaz et al. |
| 2007/0213092 A1 | 9/2007 | Geelen |
| 2007/0219706 A1 | 9/2007 | Sheynblat |
| 2007/0273624 A1 | 11/2007 | Geelen |
| 2007/0290839 A1 | 12/2007 | Uyeki et al. |
| 2008/0065318 A1 | 3/2008 | Ho |
| 2008/0114534 A1 * | 5/2008 | Yamazaki et al. ............. 701/201 |
| 2008/0147308 A1 | 6/2008 | Howard et al. |
| 2008/0195305 A1 | 8/2008 | Jendbro et al. |
| 2008/0228346 A1 | 9/2008 | Lucas et al. |
| 2008/0303693 A1 | 12/2008 | Link, II |
| 2009/0063042 A1 | 3/2009 | Santesson et al. |
| 2009/0143934 A1 | 6/2009 | Motonaga et al. |
| 2009/0192688 A1 | 7/2009 | Padmanabhan et al. |
| 2009/0196294 A1 | 8/2009 | Black et al. |
| 2009/0228172 A1 | 9/2009 | Markyvech et al. |
| 2009/0254266 A1 | 10/2009 | Altrichter et al. |
| 2009/0259354 A1 | 10/2009 | Krupadanam et al. |
| 2009/0326797 A1 | 12/2009 | Tengler et al. |
| 2009/0326801 A1 | 12/2009 | Johnson et al. |
| 2010/0010732 A1 | 1/2010 | Hartman |
| 2010/0048184 A1 | 2/2010 | Kim |
| 2010/0088018 A1 | 4/2010 | Tsurutome et al. |
| 2010/0088029 A1 | 4/2010 | Hu et al. |
| 2010/0094550 A1 | 4/2010 | Tsurutome et al. |
| 2010/0174485 A1 | 7/2010 | Taylor et al. |
| 2010/0191463 A1 | 7/2010 | Berry et al. |
| 2010/0198508 A1 | 8/2010 | Tang |
| 2010/0217482 A1 | 8/2010 | Vogel et al. |
| 2010/0241342 A1 | 9/2010 | Scalf et al. |
| 2010/0245123 A1 | 9/2010 | Prasad et al. |
| 2011/0004523 A1 | 1/2011 | Giuli et al. |
| 2011/0046883 A1 | 2/2011 | Ross et al. |
| 2011/0246016 A1 | 10/2011 | Vang et al. |
| 2011/0255481 A1 | 10/2011 | Sumcad et al. |
| 2012/0173134 A1 | 7/2012 | Gutman |
| 2013/0030630 A1 | 1/2013 | Luke et al. |

OTHER PUBLICATIONS

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

Kermit Whitfield, "A hitchhiker's guide to the telematics ecosystem", Automotive Design & Production, Oct. 2003, http://findarticles.com, pp. 1-3.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us.

TomTom, portable car navigation systems, http://www.tomtom.com, Feb. 6, 2009.

MapQuest Maps—Driving Directions—Map, http://www.mapquest.com, Aug. 25, 2009.

POI Along Route Qs, Printed from http://www.tomtomforums.com, printed Jul. 30, 2010.

Difficult POI search in Streets & Trips, printed from http://www.laptopgpsworld.com/3520-difficult-poi-search-streets-tips, printed Jul. 30, 2010.

http://www.rated4stars.com/html/gps-saves-gas.html.

http://www.gps.cx/index.php?c=1&n=493964&i=B001LTHONU&x=GPS_Buddy_FE01US_Fuel_Economy_Software_Package.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

* cited by examiner

MULTI-MODAL NAVIGATION SYSTEM AND METHOD

BACKGROUND

1. Technical Field

Various embodiments relate to navigating a route using multiple modes of transportation. In some embodiments, a route is navigated via multiple modes of transportation using a vehicle navigation system and a mobile navigation system.

2. Background Art

Various examples exist of tools that provide route information based on travel via multiple modes of transport.

For example, U.S. Pat. No. 6,834,229 issued to Rafiah et al. discloses an integrated journey planner. The integrated journey planner deconstructs user enquiries into information requests, each specifying a journey part using a single transport mode, e.g., rail, car or coach. The planner sends each request to one of a plurality of local and on-line databases, each corresponding to a different transport mode. Responses from the databases are reconstructed into multi-modal travel option(s) for the user specified journey, incorporating different transport modes. The multi-modal travel option(s) incorporates timetable travel information and non-timetable travel information. Also, a user can specify a geographical location and a transport mode to find the most suitable terminals and services for uni-modal point to point travel.

U.S. Application Publication No. 2006/0241857 discloses a navigation system, route search server, route search method, and route search program. A navigation system enables searching for an optimum route through a one-time route searching process where several destination or departure locations exist. The navigation system includes a point of interest (POI) attribute information database for accumulating POI attribute information, a network data edit means and a virtual node setup means. The navigation system determines whether there is a plurality of POIs in a certain departure location and/or a destination location by making reference to relevant data in the POI attribute information database. If there are several POIs, the virtual node setup means sets up a virtual node connected to each node of the plurality of POIs through links having identical link cost. The network data edit means then adds the virtual node to the searching network data, and a route search means functions to search for routes using the searching network data containing the added virtual node.

SUMMARY

One aspect include a method for route navigation using multiple modes of transportation. Route information may be received for generating a navigation route comprising multiple modes of transportation to a destination. GPS data may also be received. A navigation route to the destination across the multiple modes of transportation may be determined. This route may be updated as the route is traversed. For example, and without limitation, a routing change may be received and the navigation route for each of the multiple modes of transportation may be determined based on the routing change. The navigation route across the multiple modes of transportation may be output based on the GPS data.

Non-route transportation information (including, but not limited to, time information and cost information) for multiple transport types may also be received. As such, the navigation route may be output based additionally on the non-route transportation information.

In some embodiments, the navigation route may be output on a first device communicating with a second device. An event defining a change in the mode of transportation (such as, and without limitation, a key-off event, a gear change event, a key-on event, or a proximity to a transport change location) may be received on the first device. Based on the event, the navigation route may be output on the second device. The first or second device may be an in-vehicle navigation system or a nomadic device.

In some embodiments, traveler criteria (such as travel time, scenic route, or ease of travel) may be received and the navigation route may be additionally determined based on the traveler criteria.

Another aspect may include a method for route navigation using multiple modes of transport. An input on a first device may be received which defines a destination point. Based on the destination point, a navigation route may be determined on the first device which may include instructions for travelling by multiple modes of transport. The navigation route may be output on the first device according to at least one mode of transport. In response to an event defining a change in the mode of transport, determining if routing of the navigation route is performed on a second device. The navigation route may be output on the first device or the second device.

In some embodiments, route information for each of the multiple modes of transport may be received based on the destination point from multiple transport information sources. These may be publicly available sources. In this case, the navigation route may be additionally determined based on the route information from the multiple transport information sources.

The method may also include establishing a data connection with the second device. In this case, data representing the navigation route may be transferred to the second device over a data connection (such as a BLUETOOTH connection, WiFi connection, or cellular connection) in response to the event and the navigation route output on the second device.

An additional aspect may include a computer-program product for routing a navigation route that comprises multiple modes of transport. One or more inputs (such as GPS data and/or a destination) may be received defining data for determining a multi-modal navigation route. Additionally, transport-specific route information and transport-specific non-route information may be received for two or more modes of transport. The multi-modal navigation route may be determined based on the transport-specific route information and transport-specific non-route information and the one or more inputs.

An event defining a change from a first mode of transport to a second mode of transport may be received. The multi-modal navigation route may be output for the second mode of transport.

The route information and the non-route information may includes, but is not limited to, timetables, cost information, map data, train line information, bus line information, traffic information, GPS location data, road and highway information, route corridor information, elevation information, airline and airport information, indoor and/or outdoor foot paths, and bike paths.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

In various cities across the world, and particularly urban cities, using multiple modes of transport to reach a destination is not uncommon. An individual who lives in a suburb, but wants to see a museum in the city, may take a car, train, and walk to reach the museum from his or her home. Similarly, multiple modes of transport may be used as part of domestic or international travel. For example, after a traveler arrives at an arrival port (whether it be a train station, airport, bus station, etc.), the traveler may need to use at least one additional mode of transport to get to the final destination (e.g., a hotel).

When travelling via a single mode of transport, a navigation system is a handy tool to use for various reasons. Vehicles, and even some mobile phones, come equipped with a navigation system to assist the traveler in travelling from one location to another. Mobile phone users can use the phone's navigation system in a vehicle. Alternatively, the user can use it when walking to a destination. Among other reasons, uni-modal navigation systems make travelling more convenient. For example, the user inputs a destination address and the navigation system will route the use to the destination via the single mode of transport without further input from the traveler.

However, this convenience is lost when the traveler is using multiple modes of transport. The user may have to input multiple destination addresses for each mode of transport before reaching the final destination. Additionally, there may be non-navigation related information (such as timetables, train lines, etc.) that the user may need as part of the multi-modal travel which may not be automatically determined as part of the navigation route. Since vehicles and nomadic devices, such as mobile phones, are equipped to have navigation systems, leveraging this functionality to provide multi-modal navigation to a traveler would be useful.

Figure 1:
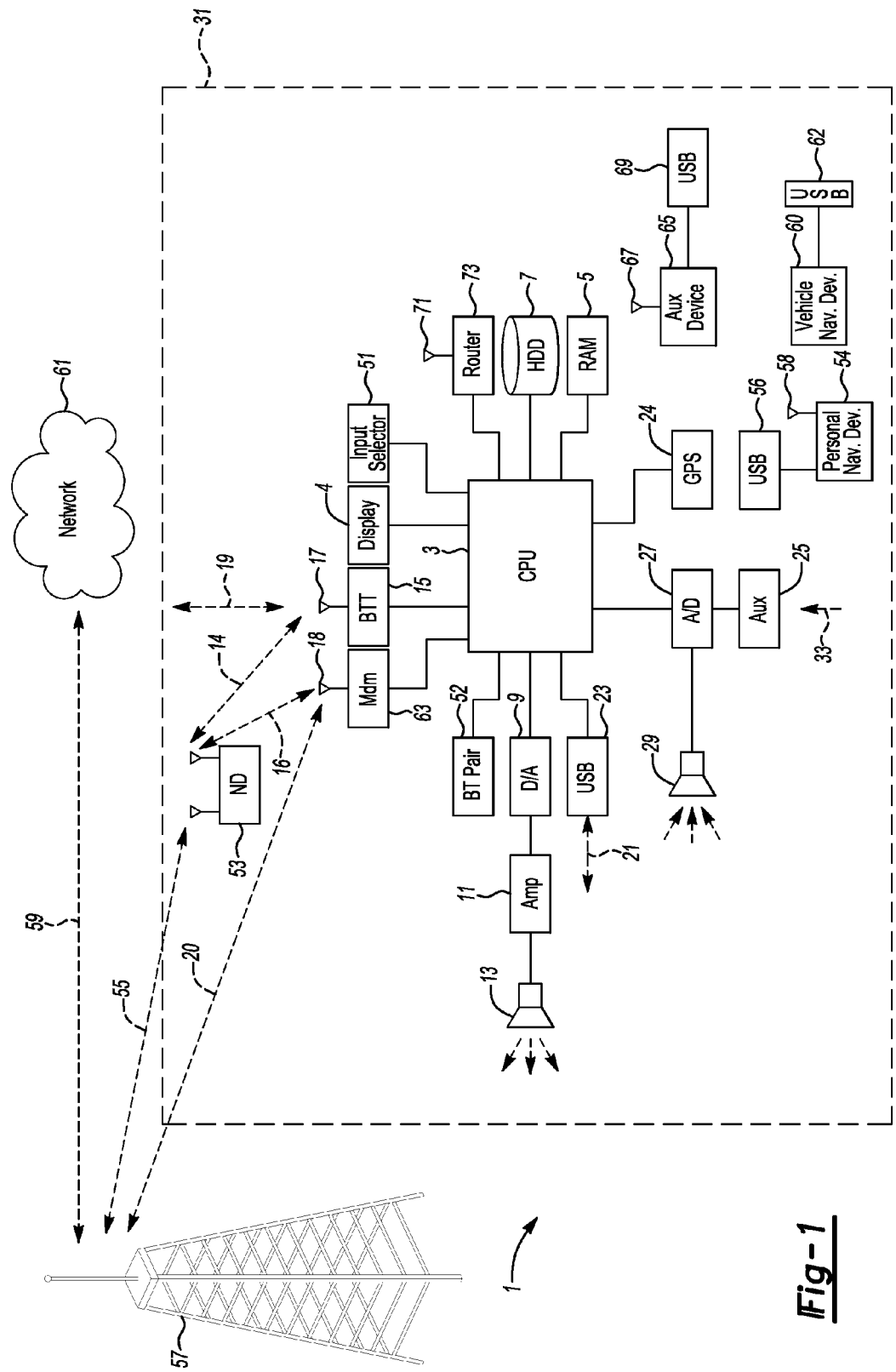
FIG. 1 illustrates a block topology of a vehicle computing system.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device (ND) 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
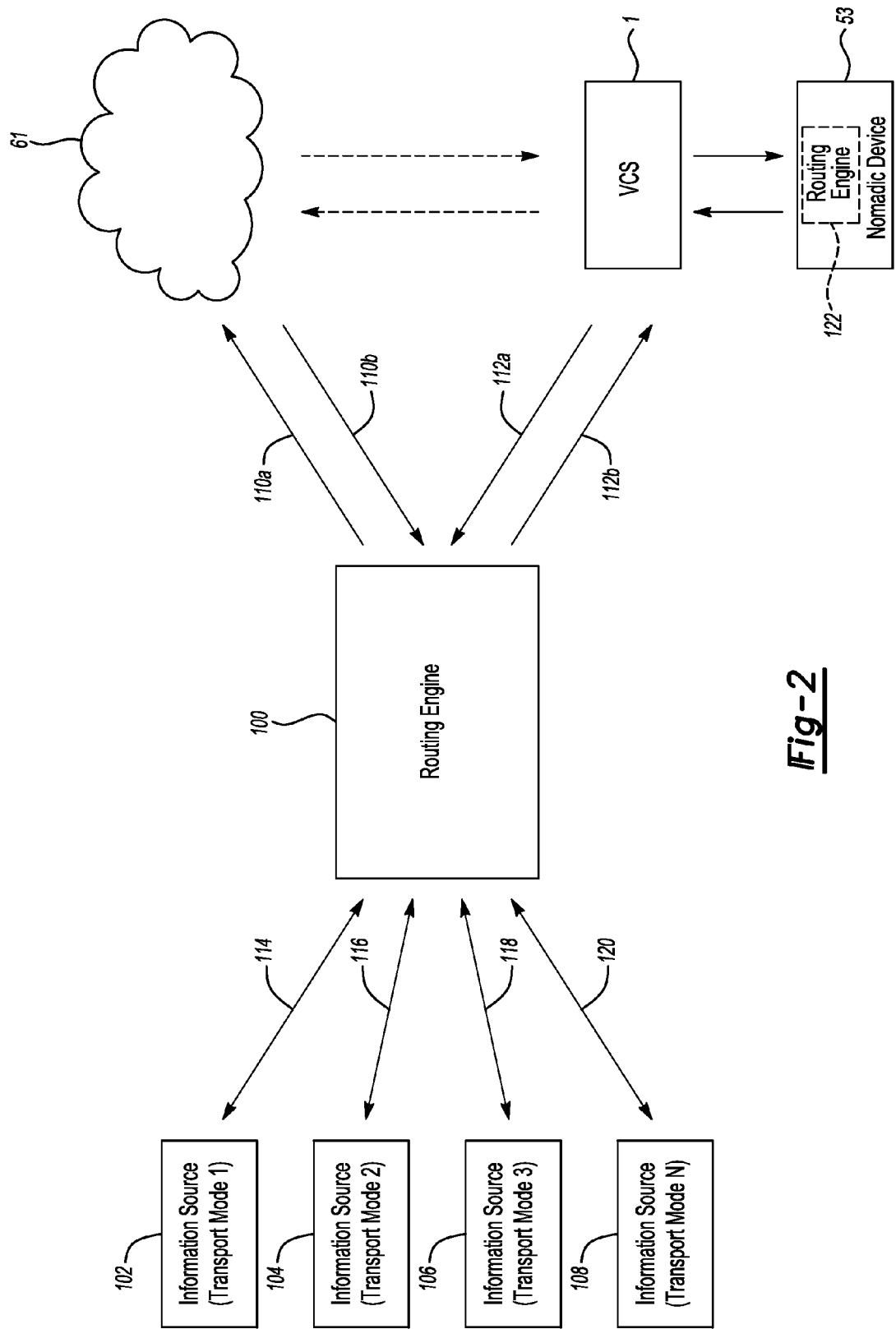
FIG. 2 illustrates a block topology of a system that generates and updates route information for navigating via multiple modes of transport.

FIG. 2 is a block topology of a navigation routing system for multiple modes of transport. A multi-modal routing engine 100 may be used for determining a multi-modal navigation route. It will be appreciated that there may more than one routing engine for determining and navigating a multi-modal route. The routing engine 100 may comprise one or more navigation algorithms for making the navigation determination. The routing engine 100 may receive route information (described below) and decompress or unpack this route information to generate a route. Non-route information (described below) may also be received by the routing engine 100 to generate a route. Accordingly, the route may be generated based on a combination of information such as (and without limitation), GPS information, traffic information, schedules and timetables, elevation information, and/or distance information (e.g., in feet, meters, miles, etc.). Further details of these navigation algorithms will be described below with respect to FIGS. 3-5.

The routing engine 100 may include instructions for outputting the navigation route as speech (via a text-to-speech (TTS) engine), graphical illustration, and/or text. The routing engine 100 may communicate with a separate engine (such as, and without limitation, a TTS engine or display engine) on the VCS 1 for outputting the multi-modal route. Additionally, the routing engine 100 may include, or communicate with, a geocoding engine for resolving GPS data into a user comprehendible form.

The routing engine 100 may be implemented on the VCS 1 and communicate data with the vehicle navigation device 60 or the PND 54. Data exchange 112a, 112b between the routing engine 100 and the VCS 1 may be bi-directional. Additionally or alternatively, the routing engine 100 may be implemented on a remote server (which may be at cloud 61) and function as a cloud-based service. Data exchange 110a, 110b between the routing engine 100 and the server may also be bi-directional. In this embodiment, the routing engine 100 may determine the navigation route and transmit the route to the VCS 1 for output to a vehicle occupant. Data communicated to the VCS 1 may be communicated through wired (e.g., and without limitation, USB) or wireless (e.g., and without limitation, WiFi) communication as described above. In one embodiment, the cloud 61 may comprise a service delivery network.

As described above, a nomadic device 53 may communicate with the VCS 1. When disconnected from the VCS 1, the ND 53 may be used to navigate non-vehicle, multi-modal routes. As such, the ND 53 may also have installed a multi-modal routing engine 122. This multi-modal routing engine 122 may be installed by a user to the ND 53 from the Internet (such as from a mobile application store or a website) or via physical mediums such as a USB drive. The ND 53 may include the necessary tools known in the art for navigating a route (such as a GPS system).

The routing engine 100 may exchange data and instructions to the ND 53 via an application programming interface (API). APIs may be implemented on the VCS 1, the NDS 53, or both. Additionally, data may be transmitted using a general transport protocol. In one embodiment, the general transport protocol may facilitate the exchange of data with NDs having different communication protocols.

Navigation route information transferred between the VCS 1 and the ND 53 to navigate a multi-modal route (e.g., vehicle and foot) may be based on the detection of a transport change event. A transport change event may be an occurrence that identifies a change in a mode of transport. Examples may include, but are not limited to, vehicle-based events (including, but not limited to, key-off, key-on, and a gear change), a connection event between a VCS 1 and the ND 53, a user input event, and a GPS location of a GPS-enabled device (e.g., a mobile phone or vehicle navigation system). The following illustrations provide further details of these examples. It will be appreciated that these example are non-limiting, non-exhaustive, and provided for illustration. Further, it will be appreciated that the transport change events may occur in combination or individually. Details of determining/calculating a navigation route is described with respect to FIGS. 3-5.

Example 1

Key-Off Even

A route to a destination requires that a user (also referred to herein as "a traveler") travel by car and foot. The portion of the route that can be travelled by car is navigated by the driver with the in-vehicle navigation system. The in-vehicle navigation system may be built-in or may be a peripheral. At a key-off event, the data representing the navigation route is transmitted to the driver's mobile phone. The user may then continue to navigate the route by foot with the mobile phone.

Example 2

Key-On Event; Connection Event; Gear Change Event

The user (from the above example), heading home, uses the mobile phone's navigation system to walk to the vehicle.

After connecting the phone to the VCS 1, at a key-on event, the navigation route is transmitted to the navigation device 54 or 60 of the VCS 1 and output to the user. Alternatively, at a connection event, such as when a connection is established with the VCS 1 via a wired or wireless connection, the navigation route may be transmitted to the VCS 1. In yet an alternative embodiment, the navigation route may be transmitted to the VCS 1 at a gear change event (e.g., and without limitation, changing from "Park" to "Drive"). One or more messages may be transmitted over the vehicle network (such as, and without limitation, a CAN bus) for outputting the navigation route from the phone to the VCS 1.

Example 3

User Input Event

A user input event may include a tactile input (such as, and without limitation, a touchscreen input, a button press, a keypad press, or a capacitive input) and/or a voice input. As an example, a route to a destination requires that a user travel by car, bus, train, and foot. The portion of the route that can be travelled by car is navigated by the driver with the in-vehicle navigation system. At the user input event, the data representing the navigation route may be transmitted to the driver's mobile phone.

The user may then continue to navigate the route with the mobile phone. At each additional mode of transport (bus, train, and foot), the user may submit the user input to navigate the route by each additional mode of transport. For example, if the navigation route says to ride "Bus X" and "Bus Y" to reach the train station, a user input event may be received on the mobile phone when the traveler rides Bus X signifying that the user is riding "Bus X." The navigation route on the mobile phone may then display the additional modes of transport (e.g., Bus Y, one or more train numbers, and/or walking directions). In some embodiments, additional information may be shown including, but not limited to, distance information, timetables, and fare costs).

On return to the vehicle, the user may submit a user input to signal that the user is in the vehicle and to run the vehicle-based navigation route in the vehicle.

Example 4

GPS Location

There may be one or more ways of determining a transport change event based on GPS location information. As one example, on return to the vehicle (from the above example), when the user is dropped off at the Bus X drop off point, a comparison may be made between the current GPS location (e.g., based on coordinates) of the user (or a "pick up point" signifying the starting point for the additional mode of transport or the final destination) and the ending GPS location of the vehicle (or the last mode of transport). A look up table may include the GPS coordinates of each location. The look up table may be created dynamically when the multi-modal route is generated. If a comparison shows a match or near match in GPS locations (e.g., between the drop off point and the pick up point), the match or near match may be recognized and the directions relating to the next mode of transport presented to the user.

As another example, when the vehicle is within a certain distance (or proximity) from the Bus X pick up point, a background transfer of the multi-modal navigation route to the mobile device may occur. Thus, the routing engine 100 may use the GPS location data to determine the distance (which may include elevation information) to the next mode of transport and, when a distance threshold is reached or passed, the navigation route may be transferred from one device to another. If the transfer is from an in-vehicle navigation system to a ND 53, the transfer may be made to any vehicle occupant's phone that is connected to the VCS 1. At or near the Bus X pick up point, the navigation route may be automatically presented to the user on the ND 53 and run in parallel on both devices. Alternatively, the Bus X navigation route may be transferred and/or presented in response to a user input (e.g., in response to a request from the routing engine 100 whether to transfer and/or present the new route on the ND 53).

Referring back to FIG. 2, routing engine 100 may use information from one or more transport information sources 102, 104, 106, 108 to generate the multi-modal navigation routes. The transport information sources 102, 104, 106, 108 may correspond to the one or more modes of transport. The transport information sources 102, 104, 106, 108 may additionally or alternatively include information such as weather, elevation information, and the like. The information sources 102, 104, 106, 108 may be public websites (or other publicly available sources). The publicly available source may or may not require a subscription to access the information.

Transportation information may be route information and non-route information utilized in determining the navigation route. Non-limiting examples of transportation information include, but are not limited to, timetables and schedules, price of fares, price of tolls, map data, train line information, bus line information, traffic information, GPS location data, road and highway information, route corridor information, elevation information, airline and airport information, indoor and/or outdoor foot paths, bike paths and bike lanes, and the like. As such, communication lines 114, 116, 118, and 120 may be direct links to the websites via the Internet.

In some embodiments, the information sources 102, 104, 106, 108 may be one or more databases that store the transportation information. In this case, communication 114, 116, 118, and 120 may be any wired or wireless communication with databases 102, 104, 106, 108 that are known in the art. The databases may be in communication with the public websites to receive updates. Alternatively or additionally, the databases may be updated manually.

It will be appreciated that the various embodiments described herein may be used during an actual, live navigation event. Alternatively, the various embodiments can be used in a testing environment (e.g., during simulation of a navigation event).

Figure 3:
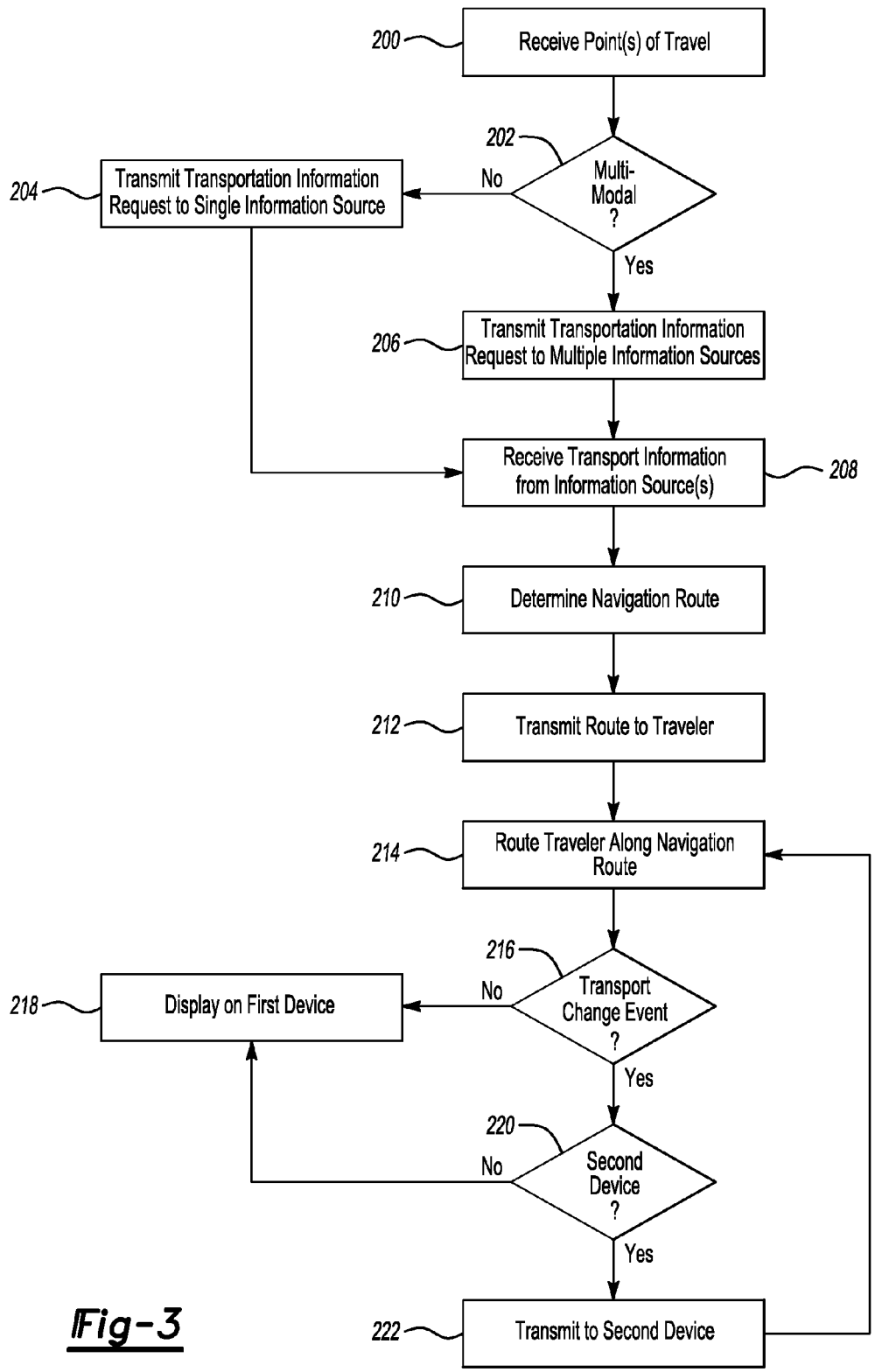
FIG. 3 illustrates a process for determining and presenting route information for navigating via multiple modes of transport.
Figure 4:
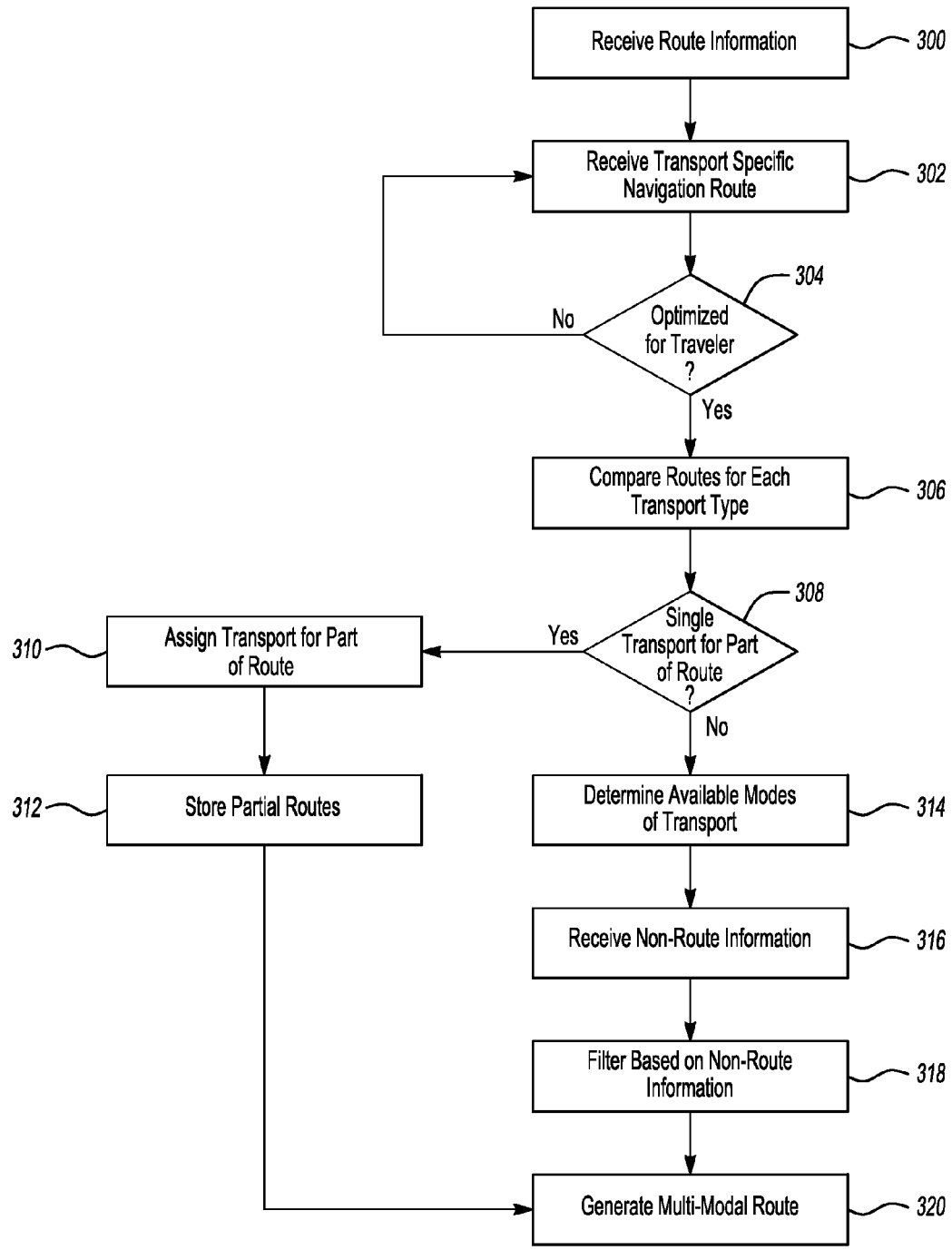
FIG. 4 illustrates a process for generating a navigation route for multiple modes of transport according to another embodiment.
Figure 5:
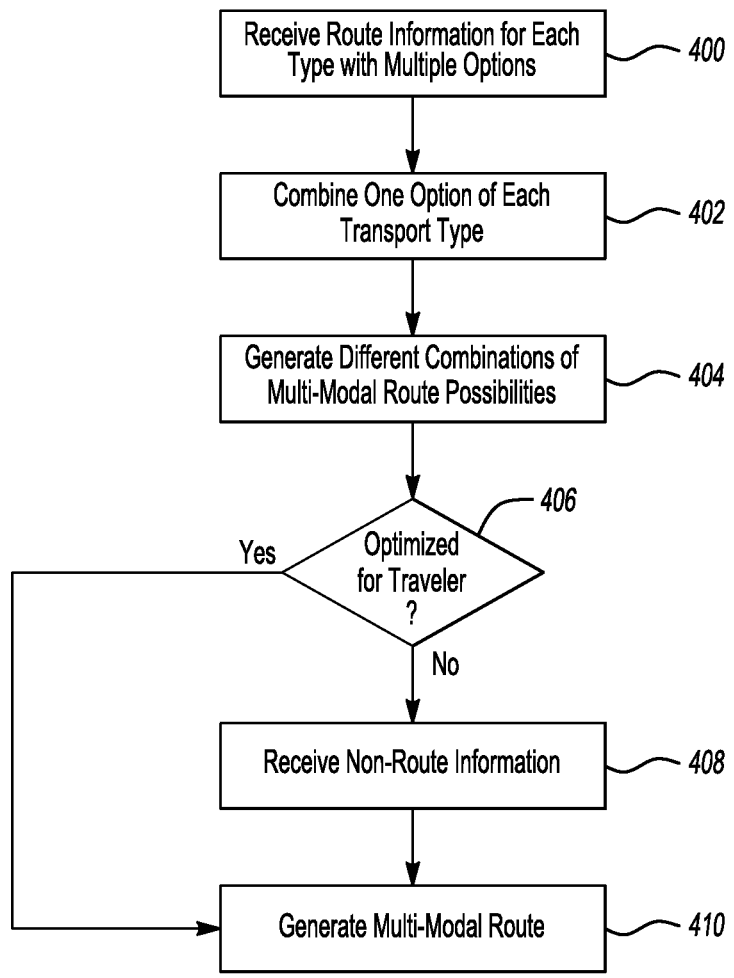
FIG. 5 illustrates a process for generating a navigation route for multiple modes of transport according to another embodiment.

FIG. 3 illustrates a process for generating and presenting a navigation route for multiple modes of transport. It will be appreciated that the disclosure and arrangement of FIG. 3 may be modified or re-arranged to best fit a particular implementation of the various embodiments of the invention. Further, for simplicity and clarity, FIGS. 3-5 are described in the context of the user beginning a navigation route in a vehicle. However, the process is not limited to this scenario such that the starting point of the navigation route may be, alternatively, outside of the vehicle.

One or more points of travel may be received as illustrated in block 200. The point(s) of travel may be received as a destination point. The destination point may be received as an address, point of interest, intersection, city center, and the like. In this embodiment, the starting address may be automatically determined based on a GPS location of the user. Alternatively, a departing point of travel and a destination point of travel may be input. The point(s) of travel may be input using tactile inputs (e.g., on a touch screen display) and/or voice inputs.

Multi-modal navigation may be automatically activated when a navigation system is run. As such, the user may be presented with an option to receive a uni-modal route or a multi-modal route. A user may select an option through tactile and/or voice inputs. Alternatively, a user may have to separately activate a multi-modal navigation system or application. In this embodiment, the multi-modal navigation system can still operate as a uni-modal navigation system.

Accordingly, a determination may be made whether a route based on the point(s) of travel includes a multi-modal navigation route (block 202). If not, a transport information request may be transmitted to a single information source 102, 104, 106, or 108 (block 204). Otherwise, the transport information request may be transmitted to multiple information sources (block 206). In one embodiment, the traveler may select the modes of transport to utilize. In this embodiment, the transport information request may be transmitted to the selected modes of transport.

The transport information request may include instructions or information for obtaining transportation information used by routing engine 100 for determining a navigation route. These instructions or information may include, but not limited to, data pertaining to the point(s) of travel, the traveler's GPS location or both. In some embodiments, the transportation information request may additionally include a user's travel criteria (described below).

The transportation information may be received at the routing engine 100 from the information resource(s) as illustrated in block 208. The transportation information may be received based on the transportation information request. Non-exhaustive and non-limiting examples of transportation information are provided above. As an example, a user with a vehicle having a solar panel roof may want a route that maximizes time in the sun. Accordingly, the traveler's destination address and a travel criterion (such as optimize route for angle of sun) may be transmitted to the transportation information sources. The routing engine 100 may then receive information from the transportation information sources providing a multi-modal route with the transportation information and the weather information.

The navigation route may be determined/calculated by the routing engine 100 (block 210). The routing engine 100 may have at least one algorithm for determining a navigation route. FIGS. 4 and 5 illustrate algorithms for determining a multi-modal navigation route. However, it will be appreciated that at least some of the operation illustrated in FIGS. 4 and 5 may alternatively or additionally be applied in a navigation route determination for a single mode of transport (i.e., a uni-modal navigation route).

The route information received may be used to generate a navigation route for each mode of transport when the transportation information is received from the transport information source(s) (block 300). One or more navigation routes may be generated for each transport type (block 302). For example, the routing engine 100 may generate route(s) for each of vehicle, train, foot, airplane, and/or bus. In one embodiment, each route may be generated at the information source(s) 102, 104, 106, 108 and the routing engine may optimize these routes as described below.

Each route may be optimized. Optimization of the route may be based on a traveler's travel criteria. Traveler criteria may include, but are not limited to, travel time, scenic route, safe route, city route, and ease of travel (e.g., and without limitation, avoiding complicated road routes, avoiding too many train, bus, and airplane transfers, etc.). The traveler may input the traveler criteria when entering the point(s) of travel. In some embodiments, the traveler may input the traveler criteria at any time. As such, if the multi-modal route has already been generated, the route may be updated based on the traveler criteria. In further embodiments, if the user does not enter traveler criteria, a default criterion may be assigned by the routing engine (e.g., easiest route). In yet further embodiments, the determination in block 304 may not occur such that the transport-specific route is always optimized because the route(s) are generated based on the traveler criteria.

If a determination is made that the route for each transport type does not account for traveler criteria (block 304), the route may be re-routed for each transport type (block 302) until each route is optimized based on the traveler criteria. Once complete, each transport specific route may be compared by the routing engine (block 306).

Based on the comparison, a determination may be made whether there is only a single mode of transport for a portion of the route (block 308). For example, for certain portions of the route, the traveler may only be able to travel by car, foot, or airplane. If so, the single mode of transport is assigned to the portion(s) of the route capable of being traveled only be that single mode of transport (block 310). The uni-modal portions of the route may be stored in memory of the VCS 1 (block 312).

For the portions of the route having multiple transport type options (block 308), the routing engine 100 may identify the available modes of transport (block 314). Non-route information may be used to filter the routes for the different modes of transport (block 316). The routes may be filtered based on the non-route information (block 318). Further, the filtering process may be performed with respect to the traveler criteria described above. Non-limiting and non-exhaustive examples of non-route information are provided above. In one embodiment, the non-route information may alternatively be used as part of the optimization process (block 304).

In one embodiment, the filtering process may be based on a ranking. For example, and without limitation, the routes may be ranked based on time, cost, distance, difficulty of travel, etc. determined from the non-route information for each transport type. The ranking information may be preprogrammed to the routing engine.

The multi-modal route is generated as illustrated in block 320. As a part of generating the multi-modal route, the partial routes assigned with the single mode of transport (block 312) may be received by the routing engine 100. The multi-modal route may then be transmitted and presented to the traveler (block 212). The route may be presented visually (including text and/or graphics) and/or audibly.

FIG. 5 illustrates a process for determining a multi-modal navigation route according to another embodiment. In some geographic locations, a traveler can use multiple highways, multiple bus lines, multiple train lines, multiple foot paths, or other transportation that has multiple options for travelling a route. As such, the navigation route determination may be additionally or alternatively made according to this scenario.

The route information received from the information source(s) may be received with the various options for each transport type (block 400). For each mode of transport, the routing algorithm may combine at least one option for one mode of transport with another option for another mode of transport (block 402). For some routes, there may be one option for a segment of the route. The routing algorithm may also generate one or more different combinations of routing possibilities for each transport type based on the various options (block 404). Thus, there may be multiple multi-modal routes for the traveler to take in reaching a destination.

A determination may be made whether the multiple multi-modal navigation options are optimized for the traveler (block 406). Non-route information may be used to filter or optimize the navigation route(s) combinations/options according to traveler criteria (block 408). This may include the ranking process described above. The multi-modal route may be generated as illustrated in block 410 for transmission and presentation to the user (block 212). The presentation may be textual, graphical, and/or audible. The route may be transmitted in one or more forms including, but not limited to, an electronic mail message, an SMS/text message, graphical images, speech based messages, and the like.

Referring back to FIG. 3, the multi-modal navigation route is presented to the traveler (block 212). At a point while routing the traveler along the navigation route (block 214), the routing engine 100 may determine if a transport change event has occurred (block 216). Examples of transport change events are provided above. In one embodiment, there may be a software application installed on the VCS 1 that may make the determination.

At least part of the routing may be based on the GPS position of the GPS-enabled device (i.e., the VCS 1 or the nomadic device 53). For example, GPS data may be used for routing along a vehicle-based route and a foot path, but not when on a train and a bus. As such, detours and route changes by the traveler may be determined. The navigation route may be re-routed based on the route change. It will be appreciated that this example is for illustration and that GPS data may be utilized in any or all segments of the multi-modal navigation route without departing from the scope and spirit of the invention.

If there is a navigation route change, transportation information may be updated based on the changes in the navigation route. The content of the information sources 102, 104, 106, and 108 may be dynamic such that the routing engine 100 may receive updated information from the information source(s) 102, 104, 106, 108 when there is a routing change. This may include receiving both route transportation information and non-route transportation information. Accordingly, routing engine 100 may monitor if a detour from the multi-modal navigation route causes a change in the non-route information. As an example, a detour by a traveler may cause the traveler to miss the given train time. As such, the routing engine 100 may then provide the traveler with the next available time. It will be appreciated that the updating process may be performed by a separate engine communicating with the routing engine 100.

At the transport change event, the device that presents the navigation route to the traveler may change between two or more devices. For example, the display may move from display 4 to a display of the ND 53. If there is no transport change event, there may not be a device change (block 218). As such, routing of the multi-modal navigation route may continue on the same device where the point(s) of travel was entered or the navigation route began.

If there is a transport change event, a further determination may be made whether a second device is detected (block 220). The navigation route may be presented on this second device if there is a transport change event. If there is not a second device, there may not be a device change and routing of the navigation route may continue for the new mode of transport on the same device.

If there is a second device, the navigation route may be transmitted to the second device (block 222). The navigation route may be presented to the traveler, and routing of the navigation route accomplished (block 214), from this second device. The presentation may be visual and/or audible. The route may be transmitted in one or more forms including, but not limited to, an electronic mail message, an SMS/text message, graphical images, speech based messages, and the like. The navigation route may be transmitted to the second device through wired (e.g., and without limitation, USB) or wireless communication (e.g., and without limitation, BLUETOOTH, WiFi, cellular, or data over voice).

In some embodiments, the navigation route may be transmitted to a portable memory device including, but not limited to, a USB drive, a memory stick, a secure digital (SD) card, a compact flash (CF) card, and the like. In this embodiment, the portable memory device may store the navigation route. When the portable memory device is connected to a memory device reader, the route may be transmitted to the device (e.g., and without limitation, a nomadic device 53 or the VCS 1).

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A computer-implemented method comprising:
   Receiving destination information at a vehicle computing system (VCS);
   determining a route to the destination, wherein different portions of the route are based on different modes of transportation;
   outputting at least a user-driven portion of the route on a vehicle display;
   detecting a vehicle event defining an end to the user-driven portion of the route; and
   outputting a remaining non-user-driven route on a portable device based on the event detection.

2. The computer-implemented method of claim 1 further comprising:
   receiving non-route transportation information for multiple transport types; and
   outputting the navigation route based additionally on the non-route transportation information.

3. The computer-implemented method of claim 2 wherein the non-route transportation information includes at least one of time information and cost information.

4. The computer-implemented method of claim 1 wherein determining a route further comprises:
   receiving a routing change; and
   determining a route for each of the different modes of transportation based on the routing change.

5. The computer-implemented method of claim 1 wherein the vehicle event is a key-off event, a gear change event, or a key-on event.

6. The computer-implemented method of claim 1 wherein the vehicle event is a proximity to a transport change location.

7. The computer-implemented method of claim 1 further comprising presenting the route as speech, graphical images, an SMS message or an electronic mail message.

8. The computer-implemented method of claim 1 further comprising:
   receiving traveler criteria; and
   determining the route additionally based on the traveler criteria.

9. The computer-implemented method of claim 8 wherein the traveler criteria includes at least one of travel time, scenic route, or ease of travel.

10. A computer-implemented method comprising:
- receiving input on a first device defining a destination;
- determining a route to the destination on the first device, including instructions for travelling by multiple modes of transport;
- outputting the route on vehicular device, according to a user-driven portion of the route;
- receiving a vehicular event defining an end to the user-driven portion of the route; and
- in response to the event, outputting the navigation route on a portable device.

11. The computer-implemented method of claim 10 wherein the event includes a key-off event, a key-on event, or a gear change.

12. The computer-implemented method of claim 10 further comprising:
- receiving route information for each of the multiple modes of transport based on the destination point from multiple transport information sources; and
- determining the route additionally based on the route information from the multiple transport information sources.

13. The computer-implemented method of claim 12 wherein the multiple transport information sources are publicly available sources.

14. The computer-implemented method of claim 10
- establishing a data connection with the portable device;
- transferring data representing the navigation route to the portable device over the data connection in response to the event; and.

15. The computer-implemented method of claim 14 wherein the data connection is at least one of a BLUETOOTH connection, WiFi connection, or cellular connection.

16. The computer-implemented method of claim 10 further comprising:
- receiving GPS data; and
- outputting the navigation route based on the GPS data.

17. A tangible computer-program product embodied in at least one computer-readable medium, having computer-readable instructions programmed for:
- receiving input on a first device defining a destination;
- determining a route to the destination on the first device, including instructions for travelling by multiple modes of transport;
- outputting the route on vehicular device, according to a user-driven portion of the route;
- receiving a vehicular event defining an end to the user-driven portion of the route; and
- in response to the event, outputting the navigation route on a portable device.

* * * * *